United States Patent [19]
Hayashida

[11] 3,951,469
[45] Apr. 20, 1976

[54] PRESSURE CONTROL DEVICE FOR VEHICLE HYDRAULIC BRAKING SYSTEM

[75] Inventor: Yoshihiro Hayashida, Chigasaki, Japan

[73] Assignee: Tokico Ltd., Japan

[22] Filed: Feb. 20, 1975

[21] Appl. No.: 551,510

[30] Foreign Application Priority Data
Feb. 22, 1974  Japan............................ 49-21110

[52] U.S. Cl............................ 303/84 A; 200/82 D; 340/52 C
[51] Int. Cl.².................................. B60T 17/18
[58] Field of Search............... 188/151 A; 137/118; 200/82 D; 303/84 A, 84 R; 340/52 C

[56] References Cited
UNITED STATES PATENTS

| | | | |
|---|---|---|---|
| 1,253,672 | 1/1918 | Decker | 239/654 |
| 1,808,654 | 6/1931 | Hagens | 239/654 |
| 2,226,136 | 12/1940 | Parker | 239/655 |
| 2,842,897 | 7/1958 | Finn | 239/654 |
| 2,844,914 | 7/1958 | Finn | 239/654 |
| 3,015,188 | 1/1962 | Reinecker et al. | 239/654 |
| 3,123,362 | 3/1964 | Elvers, Sr. | 239/654 |
| 3,304,647 | 2/1967 | Szekely | 239/654 |
| 3,672,732 | 6/1972 | Green | 303/84 A |

*Primary Examiner*—Duane A. Reger
*Attorney, Agent, or Firm*—Wenderoth, Lind & Ponack

[57] ABSTRACT

A pressure control device for use in a dual-circuits hydraulic braking system for a vehicle having a plunger assembly slidably mounted in a housing and adapted to be moved by differential pressure acting across the assembly for compensating variation in pressures in both braking circuits, and an indicator means for indicating failure in pressure in either of the circuits, in which the plunger assembly comprises two sleeves working in aligned bores in the housing, a plunger the opposite ends of which being slidably received in aligned bores formed in respective sleeves, and a stop for limiting movement of the plunger relative to the sleeve in one direction, and that movement of one of the sleeves over a predetermined distance is prevented by a stop while the other sleeve and the plunger can move further.

5 Claims, 3 Drawing Figures

PRESSURE CONTROL DEVICE FOR VEHICLE HYDRAULIC BRAKING SYSTEM

BACKGROUND OF THE INVENTION

This invention relates to a pressure control device for use in a dual hydraulic braking system of a vehicle such as an automobile, and more particularly, to improvements in a pressure control device which controls liquid pressures prevailing in two separate circuits so as to maintain a predetermined ratio therebetween and issues a warning signal when there occurs a difference over a given value range between both pressures.

It is a common practice to use a brake utilizing liquid pressure in a vehicle such as an automobile, because of its superiority in smoothness and reliability in operation. However, such a liquid pressure type brake suffers from a danger that, if a liquid leakage occurs, the brake will entirely cease to function. Thus, there has been widely used the so-called dual system, in which two independent braking circuits apply liquid pressure to the respective wheel cylinders.

Among those dual braking systems, there is known such a system which issues a warning signal such as by means of a lamp or a buzzer when the difference in the liquid pressure between both circuits exceeds a predetermined value. In a prior art braking system of the type described, the warning device will be actuated to issue a warning signal when the brake is applied and the difference in braking pressure between two circuits is above a predetermined value, but, if the brake is released, then the warning signal will no longer issue. Apart from this, there is known a system which issues a warning signal when there occurs a difference in liquid pressure between two circuits, and yet continues to issue the signal even after the brake has been released.

However, such warning devices are not adapted for use in a dual braking system in which braking pressures in two circuits are different to each other.

Further, it is also known and important to attain a balance in pressure between both circuits in applying the brake so that even and simultaneous braking forces are afforded to wheels on both sides of the vehicle, thus, there should be provided a device for eliminating small variations in braking pressure between both circuits.

SUMMARY OF THE INVENTION:

An object of this invention is to provide a pressure control device which, in normal condition, serves to maintain at an equal pressure, or at a predetermined ratio, the liquid pressures prevailing between the two braking circuits and which, when a difference in the liquid pressures between the both circuits exceeds a predetermined value, issues a warning signal which continues even after the brake has been released.

Now a description is given of the present invention in conjunction with the accompanying drawings indicating embodiments of the invention.

Figure 1:
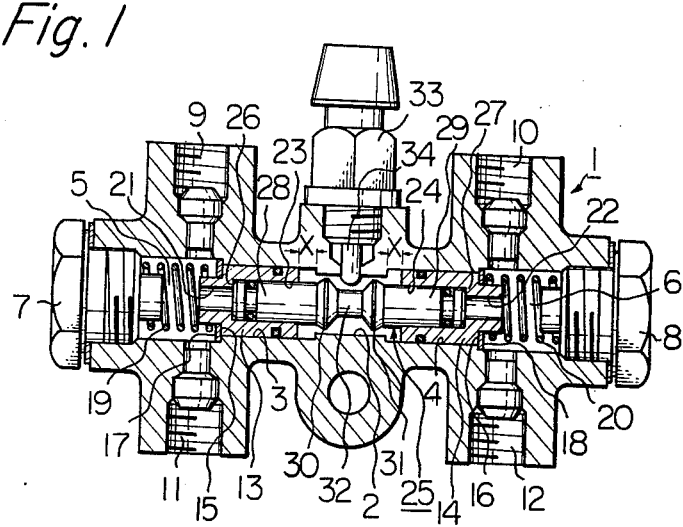
FIG. 1 is a longitudinal cross-sectional view of one embodiment of the present invention.

DESCRIPTION OF THE EMBODIMENTS:

Referring particularly to FIG. 1, a housing 1 of the pressure control device is provided in a mirror image relation with respect to the central plane extending vertically in the drawing. A bore 2 of a small diameter is provided in the central portion of the housing, while cylinder bores 3 and 4 having the same large diameter are connected to the opposite ends of the small diameter bore 2. Defined on the outer sides of the cylinder bores 3 and 4 in communication therewith are chambers 5 and 6 having diameters larger than those of the cylinder bores 3 and 4. The chambers 5 and 6 are closed by plugs 7 and 8 respectively at their outer ends.

Inlets 9 and 10 are communicated with the chambers 5 and 6 respectively and are connected to sources of hydraulic fluid under pressure such as separate pressure spaces of a master cylinder or the like respectively. Outlets 11 and 12 are communicated cylinders and the like. The inlet 9 and the outlet 11, and the inlet 10 and the outlet 12 are incorporated in respective braking circuits.

Slidably fitted in a the cylinder bores 3 and 4 in sealing relation are sleeves 13 and 14 having stepped configurations, the small diameter portions of which project into the chambers 5 and 6 respectively. Fitted on the shoulder portions 15 and 16 defined at the change in diameter of the sleeves are annular stoppers 17 and 18 which are urged against the shoulder portions by means of springs 19 and 20 which are confined between the stoppers 17 and 18 and the plugs 7 and 8. In the normal and neutral condition shown in FIG. 1 the stoppers 17 and 18 also engage with the shoulder formed between the chambers 5, 6 and the cylinder bores 3, 4.

Respective sleeves 13, 14 have stepped through bores consisting of small diameter portions 21, 22 and large diameter portions 23, 24 respectively. The large diameter portions 23, 24 receive the opposite end portions 28, 29 of a plunger 25 slidably and sealingly. The length of the plunger 25 is such that, when the stoppers 17, 18 fitted on the sleeves 13, 14 abut with the shoulder portions of the housing, the opposite ends of the plunger 25 engage with shoulder portions 26, 27 which are defined between the small diameter portion 21 and the large diameter portion 23, and between the small diameter portion 22 and the large diameter portion 24, respectively.

There are provided flanges or radial projections 30, 31 formed on the plunger 25 and positioned with a given axial spacing therebetween. The flanges 30, 31 have the contours generally V-shaped as shown, and define a small diameter portion 32 therebetween.

The axial length of the small diameter bore 2 formed in the center portion of the housing is such that the sleeves 13, 14 can move inwardly for a distance X from the neutral positions as shown. Spacings X are left between the inner ends of the sleeves 13, 14 and the shoulders defined between the cylinder bores 3, 4 and the small diameter bore 2.

An actuating rod 34 of an electric switch 33 projects into the bore 2, and the free end of the rod engages with or is positioned adjacent to the small diameter portion 32 of the plunger. The switch 33 is so arranged that when the rod 34 moves upward as viewed in the drawing, then an electric circuit (not shown) is completed for actuating a warning device such as a lamp or a buzzer.

In normal operating condition, the pressures of liquid in both circuits acting on the plunger 25 and the sleeves 13, 14 (which constitute a plunger assembly), namely, liquid flowing through the inlet 9 and the outlet 11 and acting on the plunger 25 and the sleeve 13, and liquid flowing through the inlet 10 and the outlet 12 and acting on the right end of the plunger 25 and the sleeve 14, are equal and in the opposite directions, so that the plunger assembly will not move in either direction.

If there occurs a small difference between liquid pressures in both circuits, the sleeves 13, 14 and the plunger 25 will move to the left or right, by being urged by liquid having a higher pressure, thereby bringing pressures in the both circuits into equilibrium. By determining the value of X suitably, the control device of this invention can amply compensate for the difference in pressures in both braking circuits which is caused by many factors such as difference in flow resistance in the pipeline, difference in delivery rate of the master cylinder and the like and, which otherwise causes unbalanced braking effects on the wheels of the opposite sides of a vehicle. The flanges 30, 31 of the plunger 25 are so designed that the rod 34 of the switch 33 does not engage with either of the flanges when the movement of the plunger assembly remains within the aforesaid distance X.

In case an abnormal condition occurs in either of the circuits such that a difference in liquid pressure results between both circuits exceeding a predetermined value, or liquid pressure in one of the circuits becomes zero, for instance, liquid pressure in the braking circuit on the leftside in the drawing is decreased relative to that of the rightside circuit, the plunger 25 and the sleeves 13 and 14 move to the left as a unit compressing the spring 19. Then, when the assembly moves a distance X, the left end of the sleeve 14 engages with the shoulder portion defined between the cylinder bore 4 and the small diameter bore 2 and, thus movement of the sleeve 14 will be stopped. Under such conditions, if the liquid pressure in the right-hand circuit is further increased, the plunger 25 and the sleeve 13 will move to the left, but the sleeve 14 will remain stationary. Such movement of the plunger 25 and the sleeve 13 will continue until the left end of the sleeve 13 abuts against the plug 7.

Such movement of the plunger 25 causes the rod 34 of the switch 33 to override the flange 31 to reach the large diameter portion 29, so that the switch 33 will be actuated thereby energizing the warning circuit including a lamp or a buzzer. For this end, the difference in diameter between the small diameter portion 32 and the large diameter portions 28, 29 is so determined as to be such as to actuate the switch 33.

When the liquid pressure decreases to release the braking action, the pressure acting on the sleeve 14 and the plunger 25 will decrease eventually to zero, thus, the sleeve 13 will be urged to the right under the resilient force of the spring 19. However, the plunger 25 will not return to its neutral position due to the engagement of the right side surface of the flange 31 of the plunger 25 with the tip of the rod 34. More particularly, the strength of the spring 19 (likewise at the spring 20) should be weak enough for attaining the above function. As a result, the warning device will be maintained in the actuated condition.

When the failure has been repaired so that the liquid pressures in both circuits are increased in the same manner, the pressure in the left-hand circuit will act on the sleeve 13 and the left end of the plunger 25, while pressure in the right-hand circuit acting on the right end of the plunger 25 will only be effective, since the sleeve 14 abuts with the shoulder defined between the cylinder bore 4 and the small diameter bore 2. Due to the difference in pressure receiving area, the plunger 25 and the sleeve 13 move to the right. The rod 34 of the switch 33 overrides the flange 31 and returns to the small diameter portion 32 again, so that the warning circuit will be deenergized to thereby stop the actuation of the warning device. Thereafter, when the pressures in both circuits are equal, the plunger 25 and the sleeves 13, 14 will return to their neutral positions by means of the spring force of the spring 19.

Figure 2:
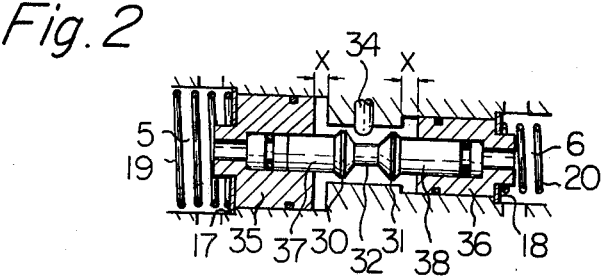
FIG. 2 is a partial longitudinal cross-sectional view of another embodiment of the invention.

FIG. 2 shows an essential portion of a modified form of a pressure control device of this invention which is adapted for use in a dual hydraulic braking system wherein pressures in both circuits are determined to have a given ratio rather than at the equal pressure. The construction of the embodiment of FIG. 2 is generally similar to that of FIG. 1 and corresponding reference numerals have been applied to similar parts.

In this embodiment, the diameters of sleeves 35 and 36 differ to each other. The sleeve 35 having pressure receiving area A1 is adapted to receive braking pressure of the first circuit which is lower than that of the second circuit acting on the sleeve 36 having a pressure receiving area A2 which is smaller than the area A1. In the embodiment, the diameters of the end portions or the large diameter portions 37, 38 of the plunger 25 which are respectively slidably received in the sleeves 35, 36 are equal to each other, but it is possible to form them so that the diameters of the portions 37 and 38 differ to each other. In that case, it is preferable to maintain the relationship between the respective pressure receiving areas $a1$, $a2$ of the portions 37, 38 and those A1, A2 of the sleeves 35, 36 such that $A1 > A2 > a1 > a2$ and $A1/A2 = a1/a2$.

The operations of the FIG. 2 and the modified form above described are same to that of FIG. 1.

Figure 3:
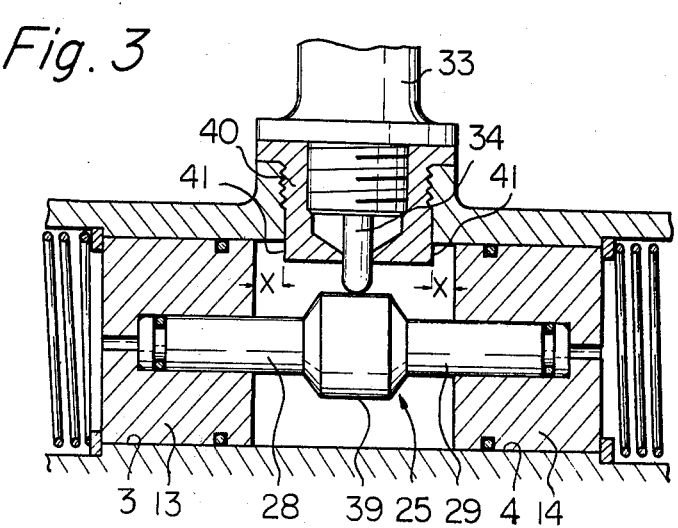
FIG. 3 is a partial cross-sectional view of a modified form of the embodiment of FIG. 2.

With the aforesaid embodiments, there are provided two flange portions 30, 31 substantially at the center portion of the plunger 25 having a suitable spacing, say $2X$, therebetween, thereby providing a small diameter portion 32 which is used as a switch actuating portion cooperating with the actuating rod 34 of the switch 33. However, the diameter of the switch actuating portion 32 in the embodiments shown in FIGS. 1 and 2 may be increased relative to the remainder portion of the plunger 25. FIG. 3 shows an embodiment wherein the center portion of the plunger 25 is formed to have a large diameter portion 39 having axial length of approximately $2X$. In this case, the switch 33 is actuated when the actuating rod 34 is extended.

In the embodiment of FIG. 3, the small diameter bore 2 is omitted, and a plug 40 threadingly secured in the radial bore in the housing projects into the through bores 3, 4. The opposite ends 41 of the plug 40 form stops for preventing inward movement of the sleeves 13, 14 exceeding a predetermined distance $X$.

As is apparent from the foregoing description, the pressure control device of this invention can control pressures in both braking circuits so as to maintain a given ratio in normal operating condition and, when failure occurs in one of the circuits, it will actuate a warning device to issue a warning signal which will continue until the system has been repaired.

I claim:

1. A pressure control device for use in a dual-circuit hydraulic system, said device comprising:
   housing means for connecting said dual circuits, said housing means having a central bore therethrough between said dual circuit;
   sleeve means coaxially slidably fitted within said central bore at each end thereof for limited movement therein in response to the difference in pressure between said dual circuits connected by said central bore;
   plunger means slidably fitted within said central bore and said sleeve means for movement within said bore and sleeve means in response to the pressure difference between said dual circuits connected by said central bore, said plunger means comprised of:
   a central portion,
   side portions coaxially spaced from each side of said central portion and slidably fitted within said sleeve means, said side portions having a diameter different than the diameter of said central portion, and
   annular slant surfaces coaxially positioned between and joining said central portion and said side portions, said slant surfaces having at least one surface sloping upward from the circumference of said side portions;
   biasing means positioned at each end of said housing means in said central bore for biasing against and urging said sleeve means toward the center of said central bore; and
   a warning device operatively fitted to said housing means for warning when the pressure difference between said circuits is not within a proper range, said warning device having an actuating rod projecting into said central bore adjacent said plunger means for actuating said warning device in response to the contact of the actuating rod with said plunger means sliding in said central bore due to the pressure difference between the dual circuits.

2. A pressure control device as claimed in claim 1 wherein:
   said central portion of said plunger means has a diameter smaller than the diameter of said side portions; and
   said annular slant surfaces joining said central portion and said side portions form annular flanges having diameters greater than the diameter of said side portions.

3. A pressure control device as claimed in claim 1 wherein:
   said central portion of said plunger means has a diameter larger than the diameter of said side portions; and
   said slant surfaces between said central portions and said side portions are sloped walls sloping upward from the outer surface of said side portions to the outer surface of said central portion.

4. A pressure control device as claimed in claim 1 wherein said sleeve means is comprised of cylindrical sleeve portions having different outside diameters slidably fitted within each end of said central bore.

5. A pressure control device as claimed in claim 1 wherein said biasing means is comprised of a compression spring located at each end of said central bore in said housing means.

* * * * *